United States Patent
Wang et al.

(10) Patent No.: US 9,634,710 B2
(45) Date of Patent: Apr. 25, 2017

(54) ELECTRONIC DEVICE AND METHOD FOR MAKING SAME

(71) Applicants: SHENZHEN FUTAIHONG PRECISION INDUSTRY CO., LTD., Shenzhen (CN); FIH (HONG KONG) LIMITED, Kowloon (HK)

(72) Inventors: Yu-Tsai Wang, New Taipei (TW); Ying-Bo Yang, Shenzhen (CN); Jiang-Long Liang, Shenzhen (CN); Bi-Ling Dong, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/810,762

(22) Filed: Jul. 28, 2015

(65) Prior Publication Data
US 2016/0301441 A1     Oct. 13, 2016

(30) Foreign Application Priority Data
Apr. 7, 2015   (CN) .......................... 2015 1 0159769

(51) Int. Cl.
H04M 1/00     (2006.01)
H04B 1/3888   (2015.01)

(52) U.S. Cl.
CPC .................. *H04B 1/3888* (2013.01)

(58) Field of Classification Search
CPC ...................................... H04B 1/3888
USPC ...................................... 455/575.1
See application file for complete search history.

(56) References Cited

U.S. PATENT DOCUMENTS

2013/0335278 A1* 12/2013 Lin ......................... H01Q 1/22
                                                    343/702

FOREIGN PATENT DOCUMENTS

TW          201351775 A     12/2013

* cited by examiner

*Primary Examiner* — Sanh Phu
(74) *Attorney, Agent, or Firm* — Steven Reiss (57) ABSTRACT

An electronic device includes a housing and a base plate. The housing includes a frame. The frame includes a metallic member and a plastic member. The plastic member is connected to the metallic member to cooperatively form the frame. The base plate includes a number of connecting tabs. The connecting tabs are fixedly attached to an inner surface of the frame.

9 Claims, 7 Drawing Sheets

ELECTRONIC DEVICE AND METHOD FOR MAKING SAME

FIELD

The subject matter herein generally relates to electronic devices and a method for manufacturing the electronic devices, particularly an electronic device having a housing and a base plate assembled together and a method for making the electronic device.

BACKGROUND

Electronic devices commonly include a housing (e.g. a front cover, a back cover, and a frame) and other members such as a base plate received in the housing and integrated with the housing. The other members can be assembled to the housing by computer numerical control (CNC). However, the CNC manufacturing process often needs a relative longer manufacturing time and has a lower efficiency.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 1:
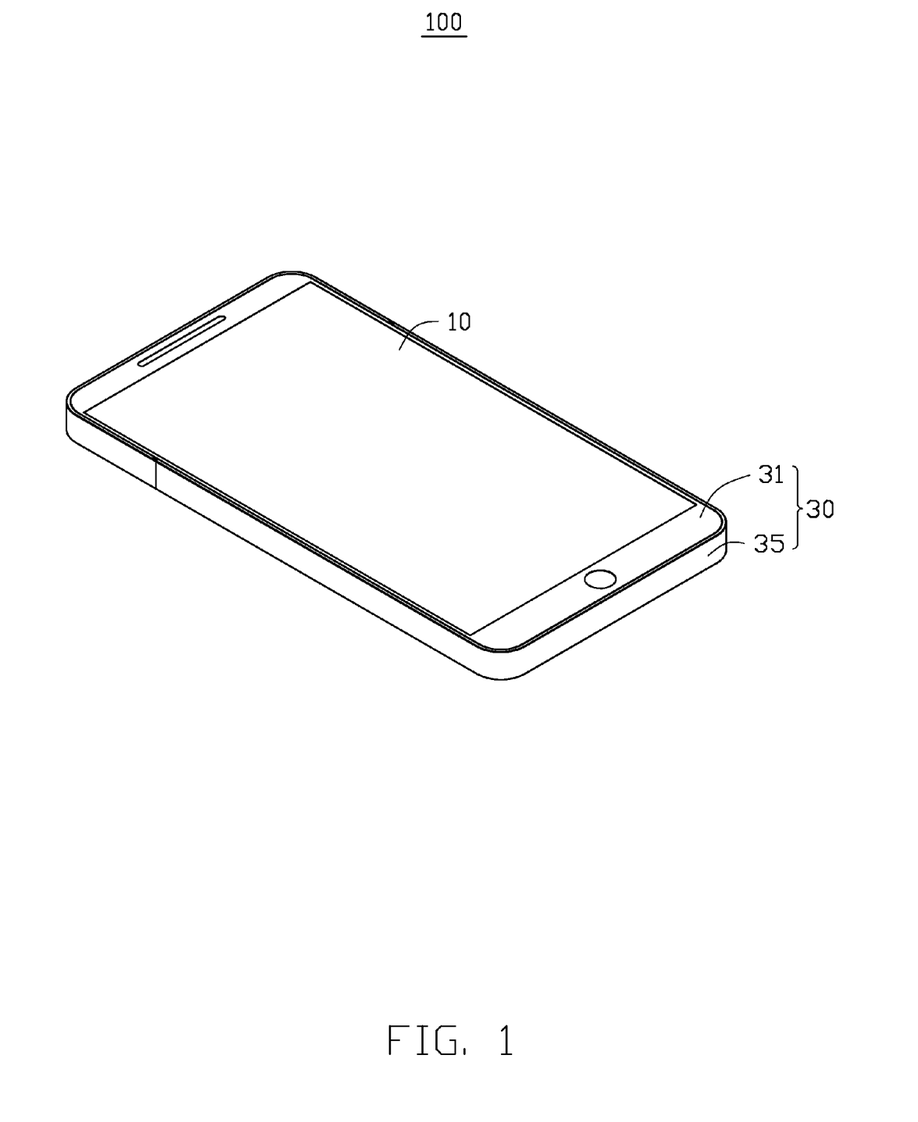
FIG. 1 is an isometric view of an electronic device, according to an exemplary embodiment.

FIG. 1 illustrates an isometric view of an electronic device 100, according to an exemplary embodiment. The electronic device 100 can be, but not limited to, a mobile phone, a personal digital assistant (PDA), and a tablet personal computer. In this exemplary embodiment, the electronic device 100 is a mobile phone.

Figure 2:
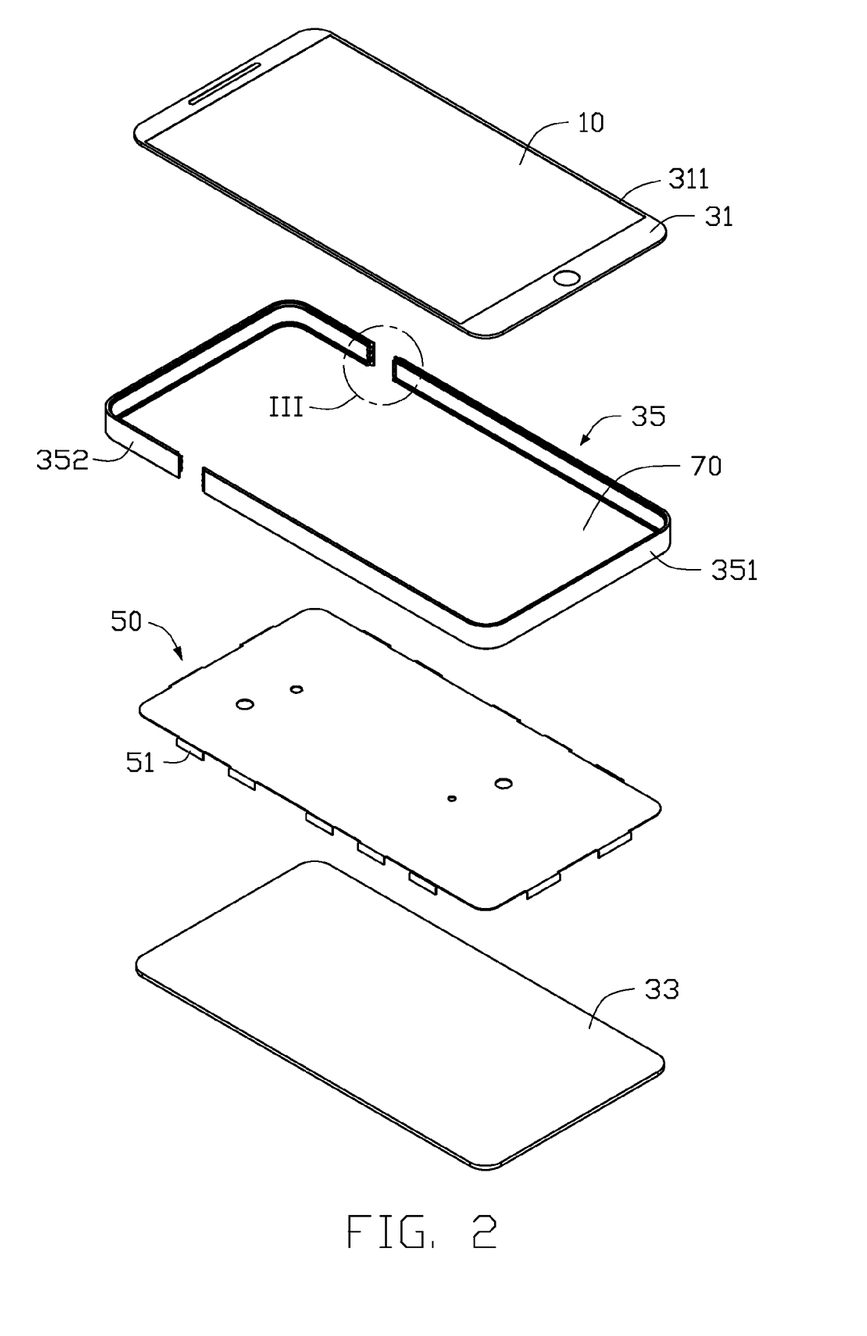
FIG. 2 is an exploded, isometric view of the electronic device of FIG. 1.

FIG. 2 illustrates that the electronic device 100 includes a window portion 10, a housing 30, and a base plate 50. The window portion 10 is assembled to the housing 30 and forms a receiving chamber 70 with the housing 30. The receiving chamber 70 is configured for receiving the base plate 50 and electronic elements such as a battery and an antenna.

The housing 30 includes a first cover 31, a second cover 33, and a frame 35. The first and second covers 31, 33 can be a front and back covers of the electronic device 100. The first cover 31 defines an opening 311 configured for receiving the window portion 10. The first cover 31 covers a first side of the frame 35. The second cover 33 covers a second side of the frame 35 opposite to the window portion 10. The second cover 33 can be made of metal, glass, or plastics. When the second cover 33 is made of metal. The metal can be a composite layer formed by different metallic layers overlapped together. In this exemplary embodiment, the composite layer is formed by an aluminum layer and a stainless steel layer overlapped together. Either of the aluminum layer or the stainless steel layer can server as an outer surface of the second cover 33.

The frame 35 includes a metallic member 351 and a plastic member 352. The metallic member 351 and the plastic member 352 are connected together to form a closed frame. In this exemplary embodiment, the frame 35 is substantially rectangular. A shape of the frame 35 can be changed according to that of the electronic device 100. In this exemplary embodiment, the metallic member 351 is defined as a first end portion of the frame 35 made of metal, and the plastic member 352 is defined as a second end portion of the frame 35 made of plastics.

Figure 3:
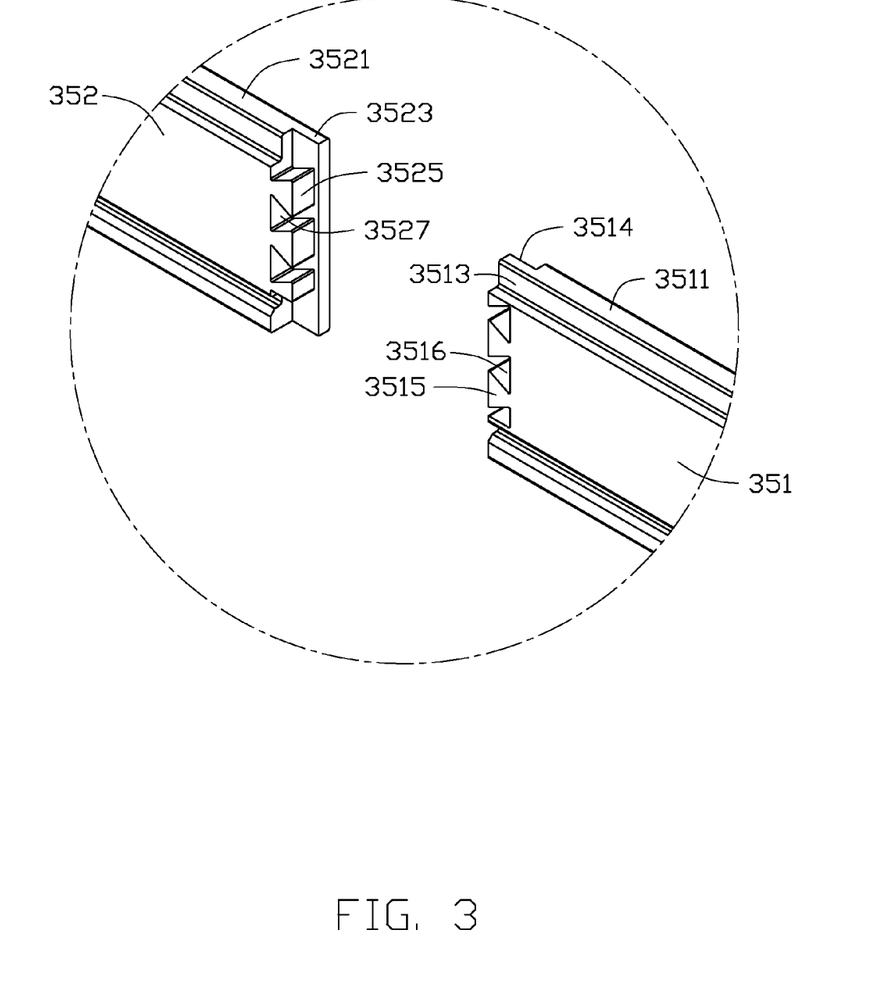
FIG. 3 is an enlarged view of the electronic device of circled portion III in FIG. 2.

FIGS. 2 and 3 illustrate that the metallic member 351 includes a base body 3511. The base body 3511 is substantially U-shaped and can be formed by die-casting, punching, or laser cutting. The base body 3511 is made of metal. The metal can be a composite layer formed by different metallic layers overlapped together. In this exemplary embodiment, the composite layer is formed by an aluminum layer and a stainless steel layer overlapped together. Either of the aluminum layer or the stainless steel layer can server as an outer surface. Thicknesses of the aluminum layer and the stainless steel layer can be adjusted according structure requirements and surface treatment of the electronic device 100.

The base body 3511 includes two opposite first end portions 3513 facing the plastic member 352. A receiving slot 3514 is defined in an outer side of each first end portion 3513 opposite to the receiving chamber 70. A plurality of first protrusions 3515 protrude from an inner side of each first end portion 3513 facing the receiving chamber 70. A first latching slot 3516 is defined between every two adjacent first protrusions 3515. In this exemplary embodiment, the first latching slots 3516 are communicated with the receiving slot 3514.

The plastic member 352 is substantially U-shaped. The plastic member 352 includes two second end portion 3521 corresponding to the first end portion 3513. A latching block 3523 protrudes from an outer side of each second end portion 3521 opposite to the receiving chamber 70 corresponding to one of the receiving slots 3514. Each latching block 3523 engages with one of the corresponding receiving slots 3514. In other exemplary embodiment, the latching blocks 3523 can protrude from the first end portions 3513, and the receiving slots 3514 can be defined in the second end portions 3521.

A plurality of second protrusions 3525 protrude from an inner side of each second end portion 3521 facing the receiving chamber 70. A second latching slot 3527 is defined between every two adjacent second protrusions 3525. The second protrusions 3525 engage with the first latching slots 3516. The first protrusions 35115 engage with the second latching slots 3527. Therefore, the metallic member 351 and the plastic member 352 are stably and fixedly connected.

In other exemplary embodiment, the second cover 33 and the frame 35 can be integrated.

According to requirements of design, when the electronic device 100 needs to reduce interference from the metallic member 351 to an antenna of the electronic device 100, the plastic member 352 can be located in a position aligning with the antenna. when the electronic device 100 needs the metallic member 351 to resonant with the antenna and to enhance the signals of the antenna, the metallic member 351 can be located in the position aligning with the antenna.

Figure 4:
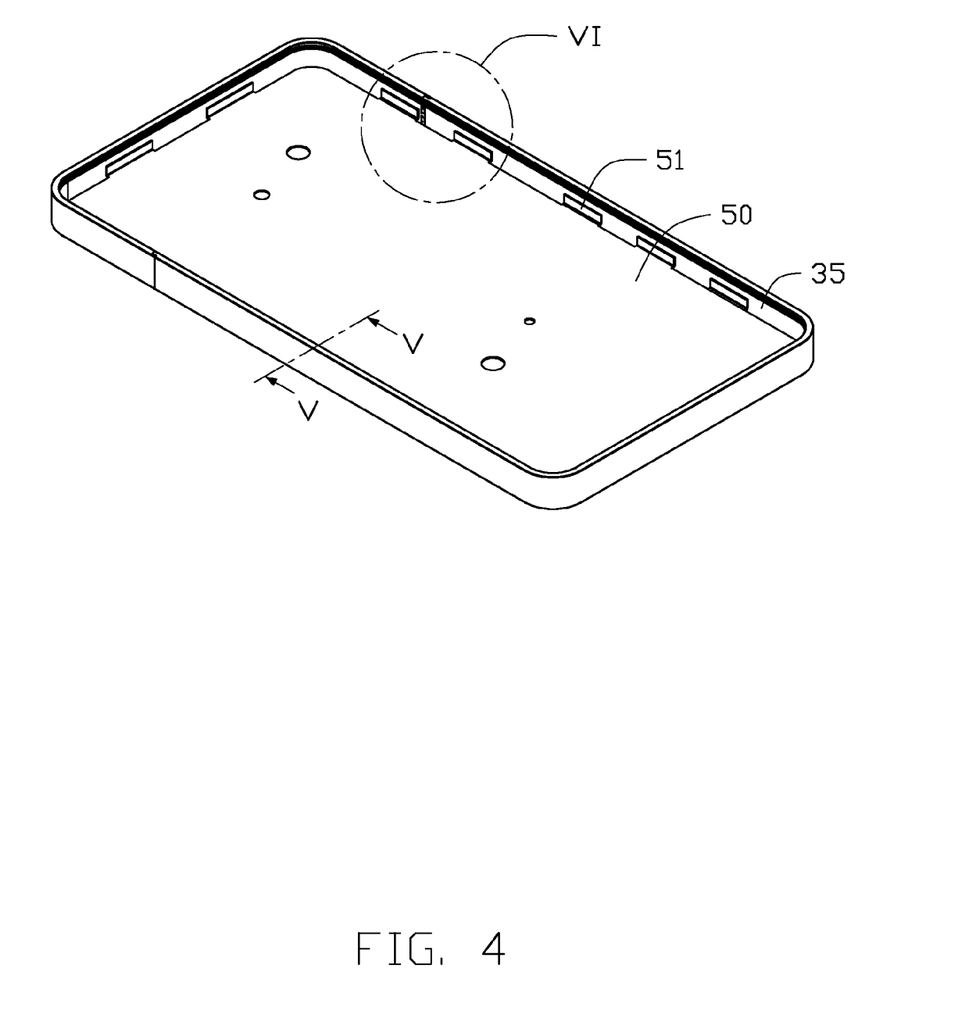
FIG. 4 is an isometric view of a frame of the electronic device of FIG. 2.
Figure 5:
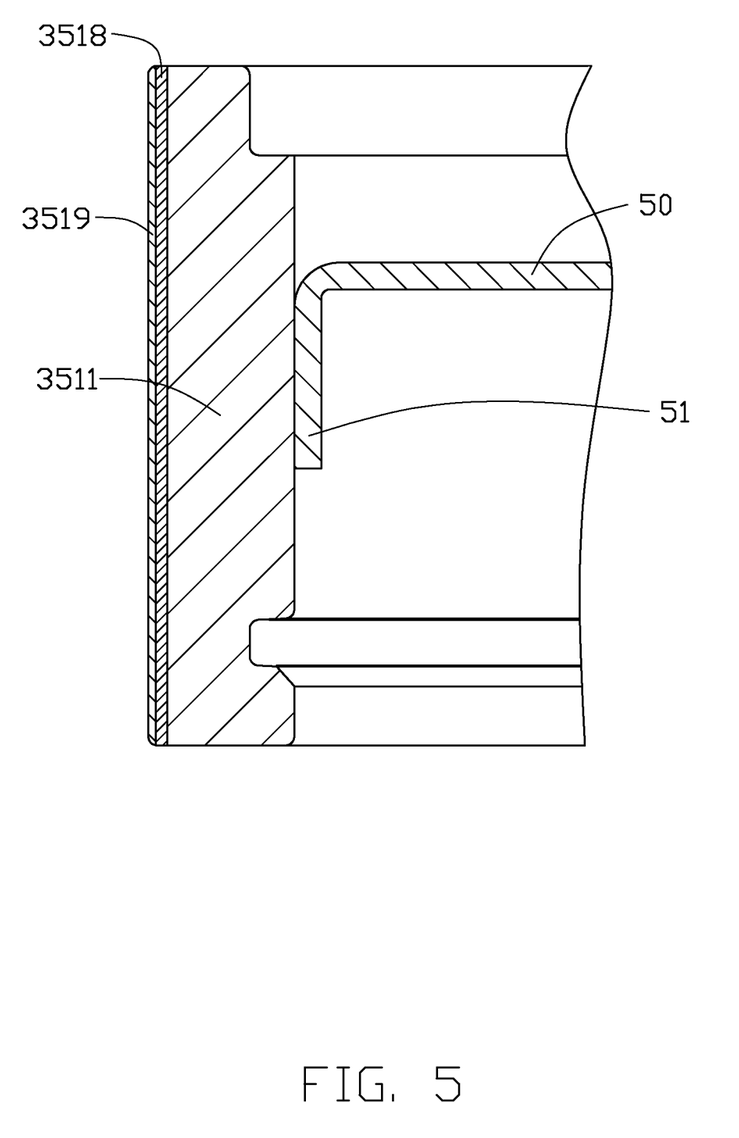
FIG. 5 is a cross-sectional view of the electronic device of FIG. 4 along line V-V.

FIGS. 4 and 5 illustrates that the metallic member 351 further includes a fingerprint proof layer 3519 formed on an outer surface of the base body 3511. The fingerprint proof layer 3519 is a composite layer formed by a silicon oxide layer and a fluoride layer overlapped together, wherein the silicon oxide layer is directly contacted with the outer surface of the base body 3511.

Figure 6:
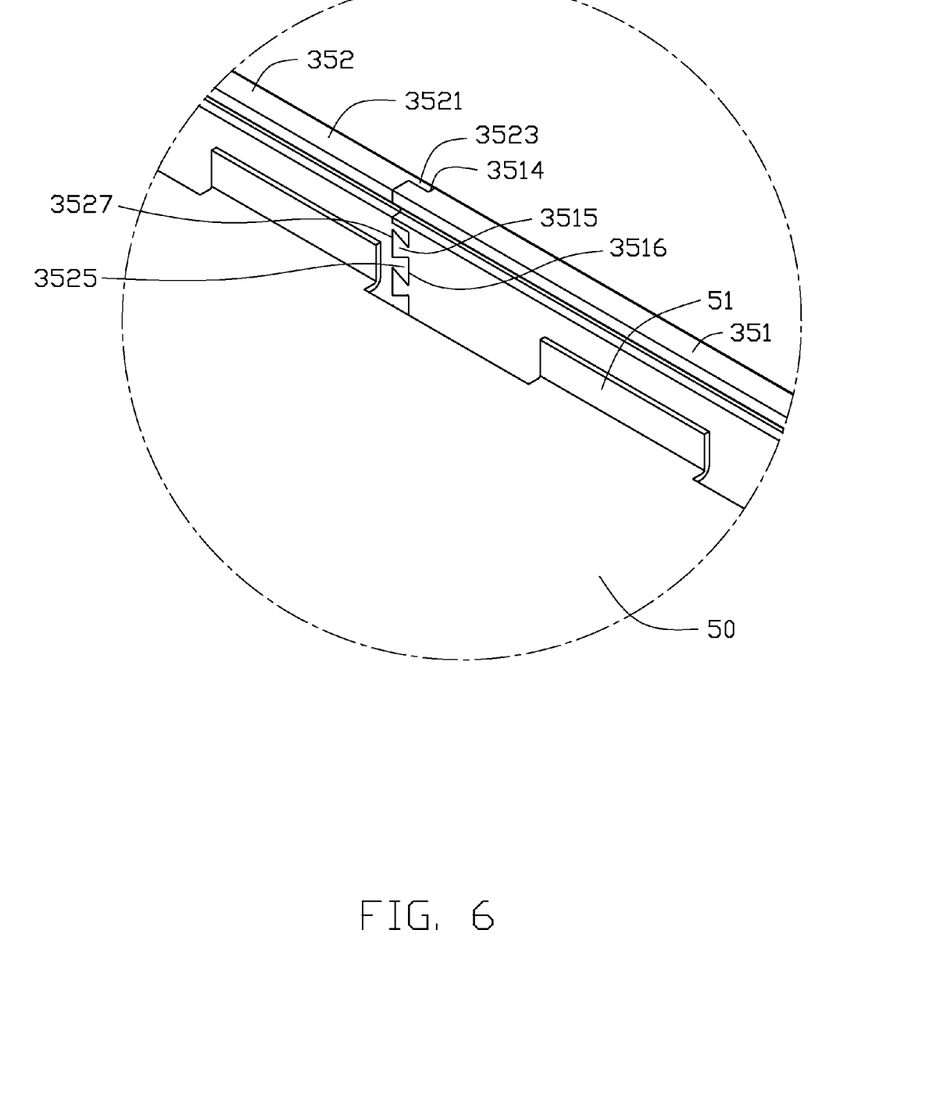
FIG. 6 is an enlarged view of the frame of circled portion VI in FIG. 4.

FIGS. 4 and 6 illustrates that the base plate 50 is received in the receiving chamber 70 and fixedly connected to the frame 35. A plurality of connecting tabs 51 perpendicular protrude from edges of the base plate 50 with an even space. Each connecting tab 51 is substantially a rectangular sheet perpendicular to the base plate 50 and facing the second cover 33. The connecting tabs 51 are attached to an inner side surface of the frame 35 by means of one of electromagnetic pulse heterogeneous combination and metal cold spray heterogeneous combination, thereby fixedly connecting the base plate 50 and the metallic member 351. The base plate 50 is a composite layer formed by different metallic layers overlapped together. In this exemplary embodiment, the composite layer is formed by an aluminum layer and a stainless steel layer overlapped together. Either of the aluminum layer or the stainless steel layer can server as an outer surface.

An exemplary method for making the electronic device 100 can include the following steps.

A base body 3511 is provided. The base body 3511 includes a shape similar to that of the electronic device 100 which is substantially U-shaped. The base body 3511 can be formed by die-casting, punching, or laser cutting. the base body 3511 can be a composite layer formed by different metallic layers overlapped together. In this exemplary embodiment, the composite layer is formed by an aluminum layer and a stainless steel layer overlapped together. Either of the aluminum layer or the stainless steel layer can server as an outer surface of the base body 3511. The base body 3511 includes two opposite first end portions 3513. At least one receiving slot 3514 is defined in an outer side of each first end portion 3513 opposite to the receiving chamber 70. A plurality of first protrusions 3515 protrude from an inner side of each first end portion 3513 facing the receiving chamber 70. A first latching slot 3516 is defined between every two adjacent first protrusions 3515. In this exemplary embodiment, the first latching slots 3516 are communicated with the receiving slot 3514.

A base plate 50 is provided, a plurality of connecting tabs 51 protrude from a surface of the base plate 50 extending toward a same direction.

The base plate 50 is connected to the base body 3511. In this exemplary embodiment, the connecting tabs 51 are attached to an inner side surface of the frame 35 by means of one of electromagnetic pulse heterogeneous combination and metal cold spray heterogeneous combination, thereby fixedly connecting the base plate 50 and the metallic member 351.

A plastic member 352 is formed by injection molding. The plastic member 352 is substantially U-shaped and connected to the base body 3511 to form a closed rectangular frame. In this exemplary embodiment, the base body 3511 and the base plate 50 is placed in a cavity of a mold (not shown). Molten plastic is injected into the cavity and solidified to form the plastic member 352 connected the base body 3511 and the base plate 50. In this exemplary embodiment, the plastic member 352 includes two second end portions 3521. The two second end portions 3521 opposite to the first end portions 3513.

In other exemplary embodiment, a latching block 3523 protrudes from an outer side of each second end portion 3521. Each latching block 3523 engages with one of the corresponding receiving slots 3514. A plurality of second protrusions 3525 protrude from an inner side surface of each second end portion 3521. A second latching slot 3527 is defined between every two adjacent second protrusions 3525. The second protrusions 3525 engage with the first latching slots 3516. The first protrusions 3511 engage with the second latching slot 3527. Therefore, the metallic member 351 and the plastic member 352 are stably and fixedly connected together to form a frame 35.

The outer surface of the base body 3511 is polished.

Figure 7:
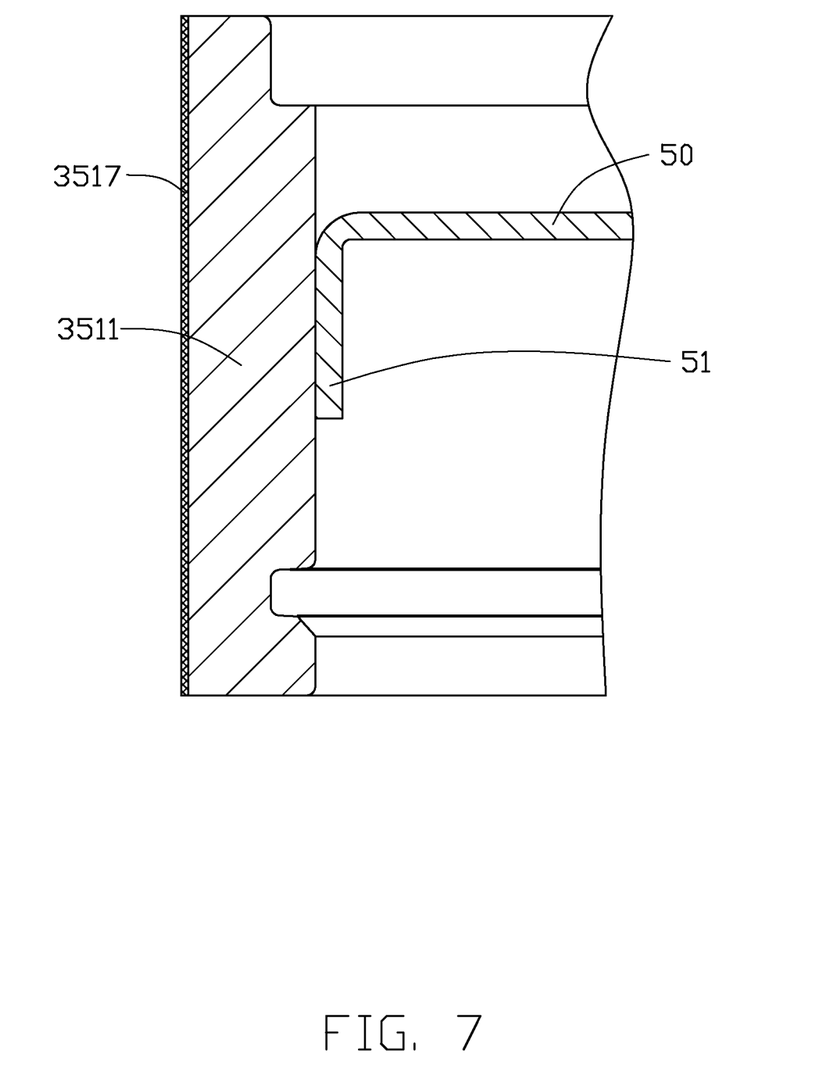
FIG. 7 is a cross-sectional view of the electronic device during the process of making the electronic device.

FIG. 7 illustrates that a shielding layer 3517 is formed on surfaces of the base plate 50 and the plastic member 352 exposed to the outside (i.e. a surface of the base plate 50 that does not contact with the metallic member 351 and the plastic member 352, and a surface of the plastic member 352 that does not contact with the metallic member 351 and the base plate 50). The shielding layer 3517 is configured for protecting the base plate 50 and the plastic member 352 from negative influence of subsequent processes. The shielding layer 3517 can be formed by spraying or printing.

A decorating layer 3518 is formed on the outer surface of the base body 3511. If the outer surface of the base body 3511 is made of stainless steel, the decorating layer is formed by PVD. If the outer surface of the base body 3511 is made of aluminum, the decorating layer is formed by anodizing.

The outer surface of the base body 3511 is plasma cleaned to increase an adhesive force of the outer surface of the base body 3511.

A fingerprint proof layer 3519 is formed on the outer surface of the base body 3511. In this exemplary embodiment, the fingerprint proof layer 3519 is formed on the outer surface of the base body 3511 by PVD. The fingerprint proof layer 3519 can be a composite layer formed by a silicon oxide layer and a fluoride layer.

The shielding layer 3517 is removed from the base plate 50 and the plastic member 352. The shielding layer 3517 can be removed by stripping or cleaner.

A second cover 33 is provided. The second cover 33 is assembled to the frame 35. The second cover 33 can be made of metal, glass, or plastics. If the base body 3511 is made of metal, the metal can be a composite layer formed by different metallic layers overlapped together. In this exemplary embodiment, the composite layer is formed by an aluminum layer and a stainless steel layer overlapped together. Either of the aluminum layer or the stainless steel layer can server as the outer surface of the base body 3511.

In addition, the fingerprint proof layer 3519 can be also formed on an outer surface of the metallic second cover 33 to avoid fingerprint.

A first cover 31 is provided. An opening 311 is defined in the first cover 31. The opening 311 is configured for receiving a window portion 10.

The window portion 10 is provided. The window portion 10 is made of glass. The window portion 10 covers the opening 311. Therefore, the electronic device 100 is manufactured. In this exemplary embodiment, the window portion 10 can be formed on the first cover 31 by means of one of electromagnetic pulse heterogeneous combination and metal cold spray heterogeneous combination.

The base plate 50 of the present disclosure includes the multiple connecting tabs 51 protruding from thereof. The connecting tabs 51 are attached to the metallic member 351 of the frame 35 by means of one of electromagnetic pulse heterogeneous combination and metal cold spray heterogeneous combination. The process of making the electronic device 100 is relative simple, has high production efficiency, and also saves material. The base plate 50 and the frame 35 can achieve a better connection effect.

In addition, when the electronic device 100 needs to reduce interference from the metallic member 351 to the antenna of the electronic device 100, the plastic member 352 can be located in a position aligning with the antenna. when the electronic device 100 needs the metallic member 351 to resonant with the antenna and to enhance the signals of the antenna, the metallic member 351 can be located in the position aligning with the antenna.

It is to be understood, however, that even through numerous characteristics and advantages of the present disclosure have been set forth in the foregoing description, together with details of assembly and function, the disclosure is illustrative only, and changes may be made in the details, especially in the matters of shape, size, and arrangement of parts within the principles of the disclosure to the full extent indicated by the broad general meaning of the terms in which the appended claims are expressed.

What is claimed is:

1. An electronic device comprising:
a housing comprising a frame, the frame comprising:
    a metallic member, and
    a plastic member,
    wherein the plastic member is connected to the metallic member to cooperatively form the frame; and
a base plate comprising a plurality of connecting tabs, wherein the connecting tabs are fixedly attached to an inner surface of the frame;
wherein the metallic member comprises a base body, the base body comprises two first end portions, the plastic comprises two second end portions opposite to the first end portions; each of the two first end portions comprises a plurality of first protrusions protruding from the corresponding first end portion, every two adjacent first protrusions define a first latching slot; each of the two second end portions comprises a plurality of second protrusions protruding from the corresponding second end portion, every two adjacent second protrusions define a second latching slot; the second protrusions engage with the first latching slots, the first protrusions engage with the second latching slots.

2. The electronic device of claim 1, wherein one of each of the two first end portions and each of the two second end portions defines a receiving slot, the other one of each of the two first end portions and each second end portion defines a receiving slot comprises a latching block protruding thereof, each latching block engages with one of the corresponding receiving slots.

3. The electronic device of claim 1, wherein the base body is a composite layer formed by an aluminum layer and a stainless steel layer overlapped together, one of the aluminum layer and the stainless steel layer server as an outer surface of the base body.

4. The electronic device of claim 3, wherein the metallic member further comprises a fingerprint proof layer formed on the outer surface of the base body.

5. The electronic device of claim 3, wherein the fingerprint proof layer is a composite layer formed by a silicon oxide layer and a fluoride layer, the silicon oxide layer is directly contacted with the other surface of the base body.

6. A method for making an electronic device comprising:
providing a metallic base body having a shape of a portion of a frame of the electronic device;
providing a base plate, the base plate comprising a plurality of connecting tabs protruding from edges thereof;
fixedly connecting the connecting tabs to an inner side surface of the base body by means of one of electromagnetic pulse heterogeneous combination and metal cold spray heterogeneous combination;
placing the base plate and the base body connected together in a mold, injecting molten plastic into the mold to form a plastic member connecting to the base plate and the base, wherein the plastic member and the metallic base body cooperative form the said frame;
providing a first cover and a second cover to cover two opposite sides of the frame; and
providing a window portion, assembling the window portion to the first cover to form the electronic device.

7. The method of claim 6, after forming the plastic member, further comprising:
forming a shielding layer on surfaces of the base plate and plastic member exposed to the outside;
forming a fingerprint proof layer on the outer surface of the base body; and
removing the shielding layer.

8. The method of claim 7, wherein the fingerprint proof layer is a composite layer formed by a silicon oxide layer and a fluoride layer, the silicon oxide layer is directly contact with an outer surface of the base body.

9. The method of claim 6, before forming the fingerprint proof layer, further comprising:
forming a decorating layer on the outer surface of the base body.

* * * * *